(12) United States Patent
Moroo et al.

(10) Patent No.: US 7,840,027 B2
(45) Date of Patent: Nov. 23, 2010

(54) DATA EMBEDDING APPARATUS AND PRINTED MATERIAL

(75) Inventors: Jun Moroo, Kawasaki (JP); Tsugio Noda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1133 days.

(21) Appl. No.: 11/319,358

(22) Filed: Dec. 29, 2005

(65) Prior Publication Data

US 2007/0003104 A1 Jan. 4, 2007

(30) Foreign Application Priority Data

Jun. 30, 2005 (JP) ............................. 2005-193143

(51) Int. Cl.
*G06K 9/00* (2006.01)
(52) U.S. Cl. ....................... 382/100; 713/176
(58) Field of Classification Search ................. 382/100, 382/232, 236–242; 380/210, 252, 287, 54; 713/176; 704/200.1, 273; 381/73.1; 348/460
See application file for complete search history.

(56) References Cited

U.S. PATENT DOCUMENTS

| | | | |
|---|---|---|---|
| 6,049,627 A * | 4/2000 | Becker et al. ............... 382/181 |
| 6,590,996 B1 * | 7/2003 | Reed et al. ................... 382/100 |
| 6,611,608 B1 | 8/2003 | Wu et al. | |
| 6,704,431 B1 | 3/2004 | Ogawa et al. | |
| 6,721,440 B2 * | 4/2004 | Reed et al. ................... 382/100 |
| 6,741,758 B2 * | 5/2004 | Hayashi et al. .............. 382/294 |
| 6,826,290 B1 * | 11/2004 | Murakami et al. ........... 382/100 |
| 7,013,021 B2 * | 3/2006 | Sharma et al. ............... 382/100 |
| 7,027,614 B2 * | 4/2006 | Reed ............................ 382/100 |
| 2002/0057823 A1 | 5/2002 | Sharma et al. | |
| 2004/0234139 A1 | 11/2004 | Moroo et al. | |

FOREIGN PATENT DOCUMENTS

| | | |
|---|---|---|
| EP | 1 022 678 A2 | 7/2000 |
| JP | 2001-024877 | 1/2001 |
| JP | 2003-78756 | 3/2003 |
| JP | 2004-512751 | 4/2004 |
| JP | 3589111 | 8/2004 |
| JP | 2004-349879 | 12/2004 |

OTHER PUBLICATIONS

European Search Report dated Oct. 24, 2006 issued in corresponding European Application No. EP 05113108.

(Continued)

*Primary Examiner*—Anand Bhatnagar
(74) *Attorney, Agent, or Firm*—Staas & Halsey LLP (57) ABSTRACT

An apparatus embeds data into an area of image data. The apparatus determines whether colors of the area are specific colors, modifies image data of the area based on a determination result, and embeds the data into the area.

10 Claims, 12 Drawing Sheets

OTHER PUBLICATIONS

"Adaptive Color Watermarking", Alastair Reed et al., Security and Watermarking of Multimedia Contents IV, vol. 4675, 2002. pp. 222-229.

"An Improved Retrieval Method for Amplitude Modulation Based Digital Watermarking", K. Janthawongwilai et al, 2004 IEEE Region 10 Conference Chiang Mai, Thailand, Nov. 21-24, 2004, pp. 299-302.

"Region-Based Image Watermarking", Athanasios Nikolaidis et al, IEEE Transactions on Image Processing, vol. 10, No. 11, Nov. 2001, pp. 1726-1740.

"Watermarking scheme based on support vector machine for colour images", Y. Fu et al., Electronics Letters, IEE Stevenage, vol. 40, No. 16, Aug. 5, 2004, pp. 986-987.

Notice of Rejection mailed Dec. 11, 2007 for corresponding Japanese application 2005-193143.

* cited by examiner

EMBEDDING DATA 1 0 1 0 1 1 0 1 0 1 0 0 1 0 1 0

150a EMBEDDING STRENGTH SPECIFYING TABLE

| MINIMUM VALUE \ DIFFERENCE BETWEEN MAXIMUM VALUE AND MINIMUM VALUE | 0 | 1 | 2 | ... | 20 | 21 | ... | 254 | 255 |
|---|---|---|---|---|---|---|---|---|---|
| 0 | | 10 | 10 | ... | 20 | 20 | ... | 254 | 255 |
| 1 | 10 | 10 | 10 | ... | 20 | 20 | ... | 40 | 40 |
| 2 | 10 | 10 | 10 | ... | 20 | 20 | ... | 40 | |
| ... | ... | ... | ... | ... | ... | ... | ... | | |
| 20 | 15 | 15 | 15 | ... | 25 | 25 | ... | | |
| 21 | 15 | 15 | 15 | ... | 25 | 25 | ... | | |
| ... | ... | ... | ... | ... | ... | ... | | | |
| 254 | 0 | 0 | | | | | | | |
| 255 | 0 | | | | | | | | |

EMBEDDING STRENGTH SPECIFYING TABLE

| MINIMUM VALUE \ DIFFERENCE BETWEEN MAXIMUM VALUE AND MINIMUM VALUE | 0 | 1 | 2 | ... | 20 | 21 | ... | 254 | 255 |
|---|---|---|---|---|---|---|---|---|---|
| 0 | 10 | 10 | 10 | ... | 20 | 20 | ... | 254 | 40 |
| 1 | 10 | 10 | 10 | ... | 20 | 20 | ... | 40 | 40 |
| 2 | 10 | 10 | 10 | ... | 20 | 20 | ... | | |
| ... | ... | ... | ... | ... | ... | ... | ... | | |
| 8 | 15 | 15 | 15 | ... | 25 | 25 | ... | | |
| 9 | 15 | 15 | 15 | ... | 25 | 25 | ... | | |
| ... | ... | ... | ... | ... | ... | ... | ... | | |
| 14 | | 0 | | | | | | | |
| 15 | 0 | 0 | | | | | | | |

FIG.15

DATA EMBEDDING APPARATUS AND PRINTED MATERIAL

BACKGROUND OF THE INVENTION

1. Field of the Invention

The present invention relates to a technology for embedding data into image data.

2. Description of the Related Art

A technology for embedding invisible data into digital data or printed images, in other words, digital watermarking technology has been developed. However, image quality degrades when data is embedded into a printed image by the digital watermarking technology.

In the digital watermarking technology disclosed in Japanese Patent Laid-Open Publication No. 2004-512751 and Japanese Patent No. 3589111, complexity of an image area in which data is embedded is analyzed based on a standard deviation or a frequency component of the image area. Based on the complexity, embedding strength (for example, degree of change in grayscale values of the image) of data is controlled, thereby preventing degradation of image quality of the printed image.

In the digital watermarking technology disclosed in Japanese Patent No. 2003-78756, localized complexity of the image is computed and embedding strength of data is modified according to the localized complexity to prevent degradation of image quality.

However, in the conventional technology, image quality of the image having embedded data degrades as compared to the original image.

To be specific, when embedding data into an image by using the conventional technology, complexity of the image area in which data is to be embedded is analyzed, and embedding strength is controlled according to the complexity only. Due to this, data is embedded indiscriminately into an image area such as a white image area that suffers a degradation of image quality even due to a minute change in grayscale values, thereby resulting in degradation of the image quality.

SUMMARY OF THE INVENTION

It is an object of the present invention to at least solve the problems in the conventional technology.

According to an aspect of the present invention, an apparatus for embedding data into an area of image data includes a determining unit that determines whether colors of the area are specific colors, and an embedding unit that modifies image data of the area based on a determination result of the determining unit, and embeds the data into the area.

According to another aspect of the present invention, an apparatus for embedding data into an area of image data includes an embedding unit that detects a degree of change of a feature of the area, sets an amount of modification of image data of the area based on detected degree of change, modifies the image data of the area based on set amount of modification, and embeds the data into the area.

According to still another aspect of the present invention, an apparatus for embedding data into an area of image data includes a determining unit that determines whether colors of the area are specific colors, and an embedding unit that controls, when the determining unit determines that the colors are specific colors, the data so as not to be embedded, detects a degree of change of a feature of the area, sets an amount of modification of the image data of the area based on detected degree of change, modifies the image data of the area based on set amount of modification, and embeds the data into the data.

According to still another aspect of the present invention, a computer-readable recording medium stores therein a computer program that implements a method according to the present invention on a computer.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be described below with reference to accompanying drawings. The present invention is not limited to these embodiments.

Figure 1:
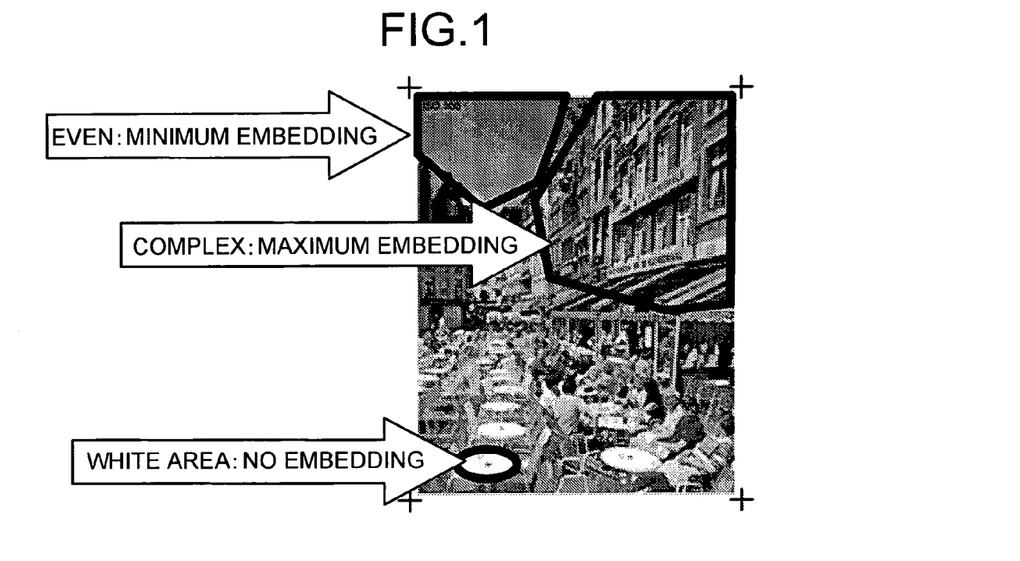
FIG. 1 depicts a concept of an image data processor according to an embodiment of the present invention.

FIG. 1 depicts a concept of an image data processor according to an embodiment of the present invention. The image data processor is an example of a data embedding apparatus according to the embodiment.

When embedding data into image data, the image data processor determines whether colors of an image area into which data is to be embedded (hereinafter, "embedding area") are specific colors or near-specific colors (for example, white, gray etc.).

If the colors of the embedding area are not specific colors or near-specific colors, the image data processor detects complexity of the embedding area, controls embedding strength according to the complexity, and embeds predetermined data into the embedding area. The embedding strength indicates the amount of modification that changes the image in the embedding area. The amount of modification increases with increase in the embedding strength.

The image data processor does not embed data into the embedding area if the embedding area includes specific colors or near-specific colors, thereby enabling to prevent degradation of image quality.

Further, if the embedding area does not include specific colors, the image data processor according to the embodiment sets the embedding strength according to the complexity of the embedding area and embeds data, thereby enabling to prevent degradation of image quality and to enhance success rate during decoding.

Figure 2:
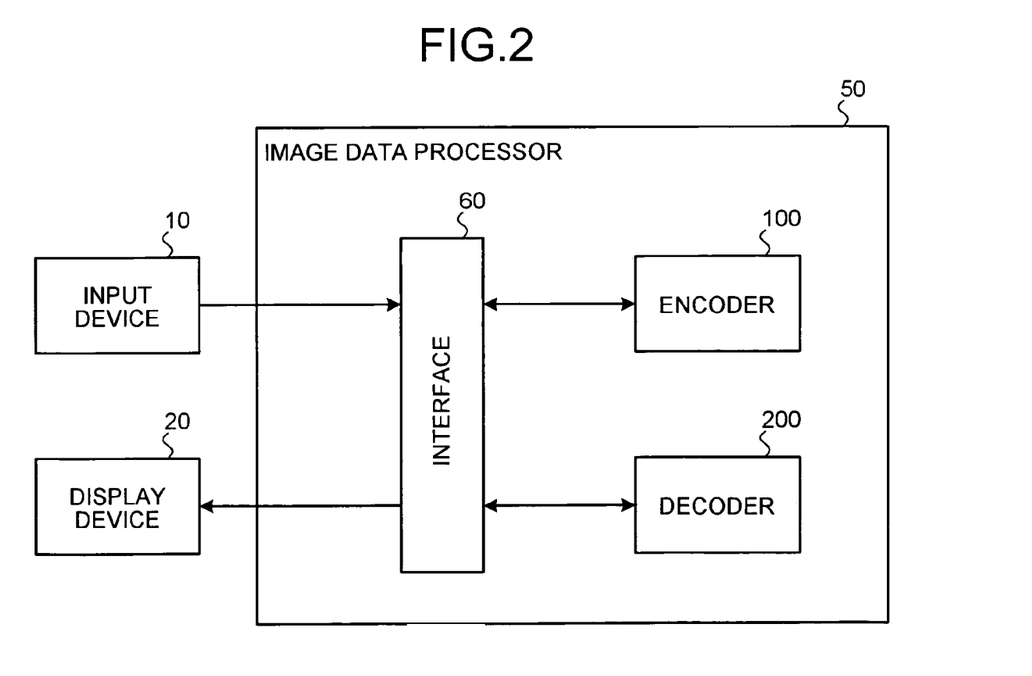
FIG. 2 is a functional block diagram of the image data processor according to the embodiment.

FIG. 2 is a functional block diagram of the image data processor according to the embodiment. An image data processor 50 includes an interface 60, an encoder 100, and a decoder 200. The image data processor 50 is also connected to an input device 10 such as a keyboard, a mouse, a scanner etc. and a display device 20 such as a display.

The interface 60 transfers data that is input from the input device 10 to the encoder 100 or the decoder 200. The interface 60 also transfers data that is output from the encoder 100 or the decoder 200 to the display device 20.

Figure 3:
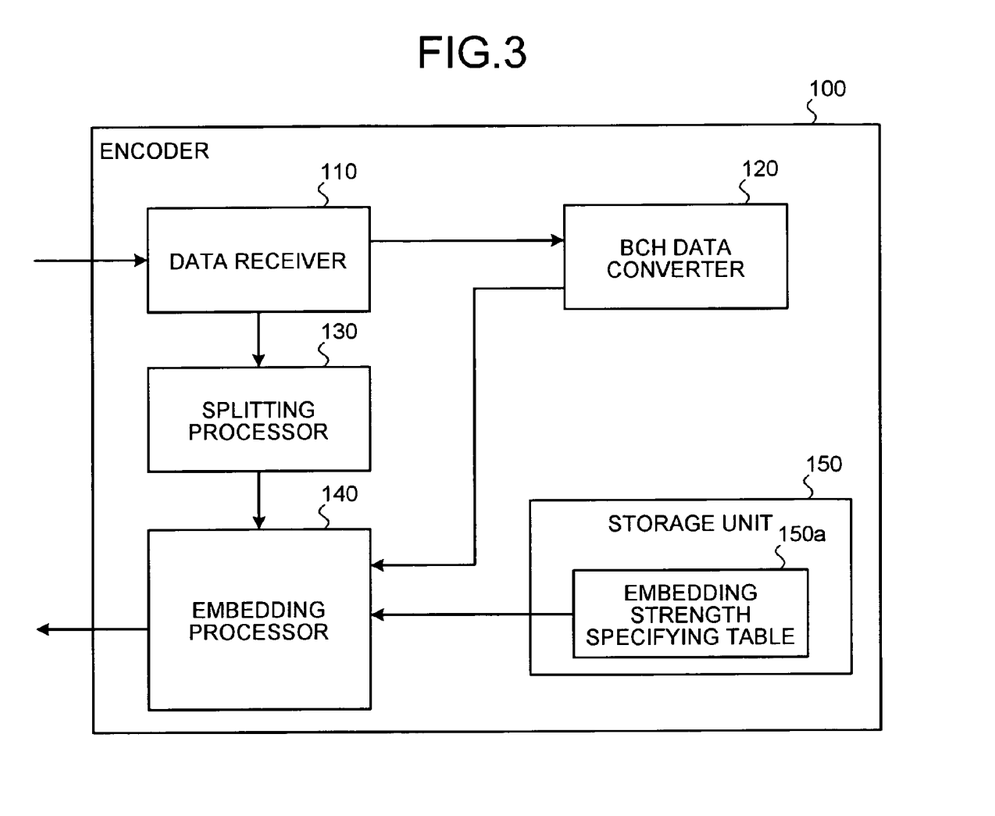
FIG. 3 is a functional block diagram of an encoder shown in FIG. 2.

The encoder 100 embeds predetermined data into the original image data that is input from the input device 10. FIG. 3 is a functional block diagram of the encoder 100 shown in FIG. 2. As shown in FIG. 3, the encoder 100 includes a data receiver 110, a Bose Chaudhuri Hocquenghem (BCH) data converter 120, a splitting processor 130, an embedding processor 140, and a storage unit 150.

Figure 4:
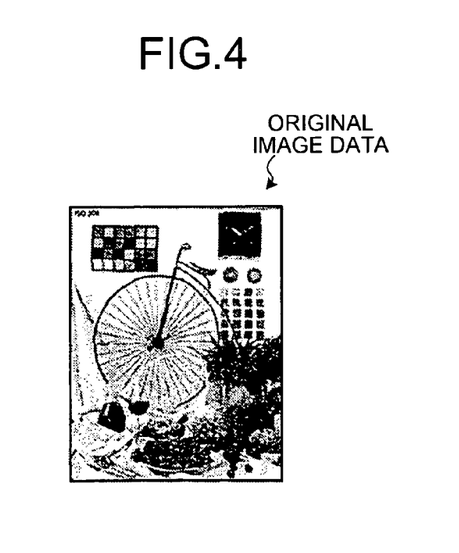
FIG. 4 depicts an example of original image data.
Figure 5:
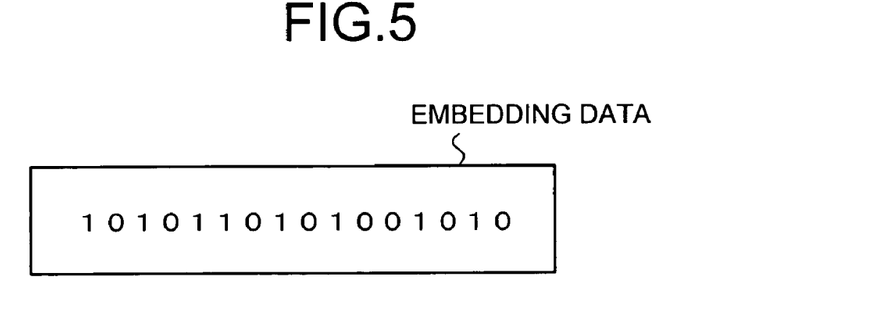
FIG. 5 depicts an example of embedding data.

The data receiver 110, upon fetching the original image data from the input device 10, passes the fetched original image data to the splitting processor 130, and upon fetching data for embedding into the original image data from the input device 10 (hereinafter, "embedding data"), passes the fetched embedding data to the BCH data converter 120. FIG. 4 depicts an example of the original image data, and FIG. 5 depicts an example of the embedding data.

The BCH data converter 120 encodes the embedding data consisting of x bits by using an error correcting code (for example, a BCH code) and generates a code for the error correcting code.

The code for the error correcting code is a total (x+y bits) of the embedding data (x bits) and a redundant bit (y bit) that is computed from the embedding data and a predetermined computational expression. In other words, if an error occurs in the code for the error correcting code, the original embedding data can be restored by error correction. The BCH data converter 120 passes the generated code for the error correcting code to the embedding processor 140.

Figure 6:
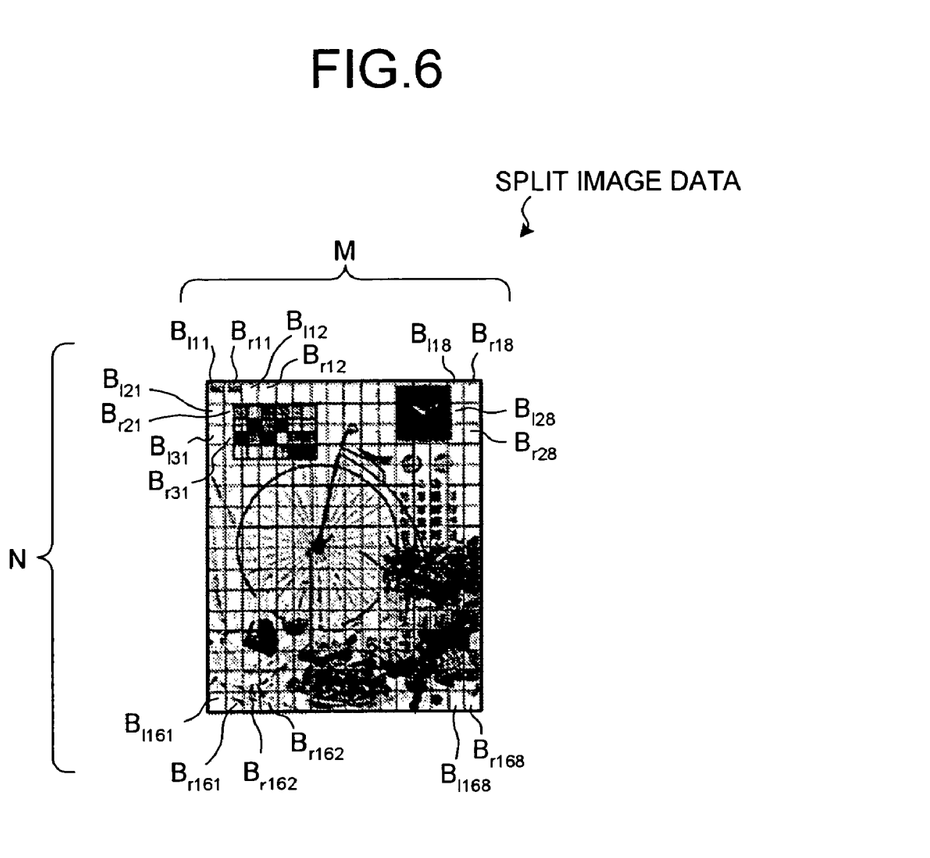
FIG. 6 depicts an example of the split image data.

The splitting processor 130 fetches the original image data from the data receiver 110, splits the fetched original image data into blocks of N rows and M lines, and passes the split original image data (hereinafter, "split image data") to the embedding processor 140. FIG. 6 depicts an example of the split image data.

The split image data includes 256 blocks such as block Bl11, Br11, Bl18, Br18, Bl168, Br168 and so on. The split image data shown in FIG. 6 is one example of the split image data, and the original image data can also be split in other ways.

The embedding processor 140 fetches the split image data from the splitting processor 130 and embeds the code for the error correcting code into the split image data. Next, a process of the embedding processor 140 is explained in detail. First, the embedding processor 140 extracts a block pair from the split image data and determines whether all the pixel levels of Red Green Blue (RGB) in the extracted block pair exceed a predetermined value (for example, exceeding 200). If all the pixel levels of RBG in the extracted block pair exceed the predetermined value, the embedding processor 140 does not embed data and extracts the next block pair.

A block pair includes two blocks such as blocks Bl11 and Br11, blocks Bl18 and Br18, blocks Bl168 and Br168 and so on. The embedding processor 140 extracts each block pair in the sequence of blocks Bl11 and Br11, blocks Bl18 and Br18, blocks Bl168 and Br168 and so on.

Figure 7:
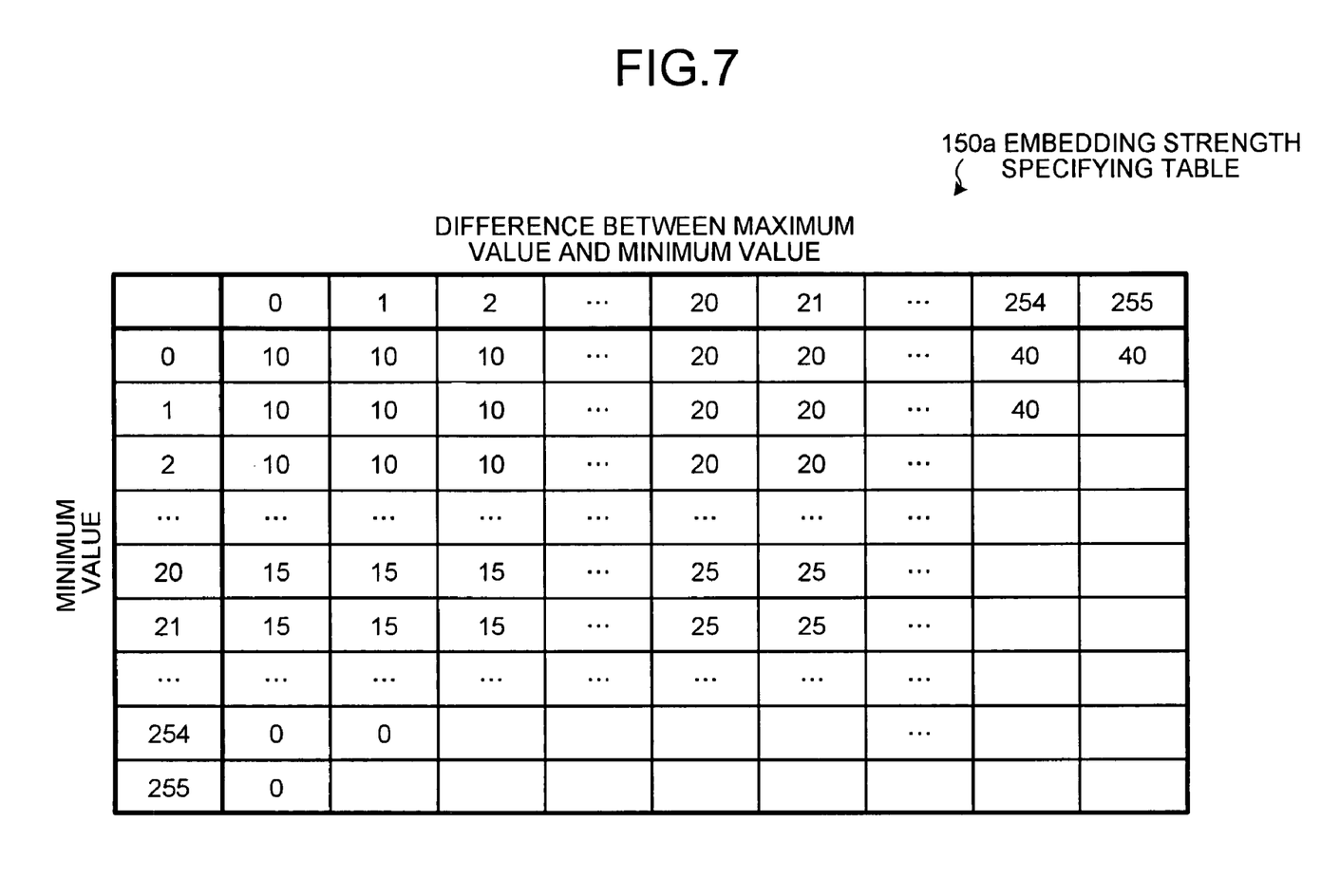
FIG. 7 depicts an example of an embedding strength specifying table.

If the pixel levels in the extracted block pair are lower than the predetermined value, the embedding processor 140 sets embedding strength based on the average density of B from each block of the block pair (average density of Blue in RGB) and an embedding strength specifying table 150a shown in FIG. 7, and embeds predetermined data (the corresponding code for error correcting code 1 or 0) into the block pair.

As shown in FIG. 7, the embedding strength is specified based on the minimum value from the vertical axis (lower value in the values of average density of B from each block of the block pair) and a difference between the minimum value and the maximum value from the horizontal axis (a difference between the highest grayscale level and the lowest grayscale level of B from each block of the block pair) of the embedding strength specifying table 150a.

A block pair of blocks Bl11 and Br11 is used as an example to explain the process of the embedding processor 140. (Pixel levels of RBG in the blocks Bl11 and Br11 of the block pair are assumed to be less than 200). First, the embedding processor 140 detects the highest grayscale level and the lowest grayscale level from the two blocks Bl11 and Br11 to set the embedding strength. For example, if the minimum density of B from the blocks Bl11 and Br11 is 20, and the maximum density of B from the blocks Bl11 and Br11 is 40, the embedding strength according to the embedding strength specifying table 150a shown in FIG. 7 is 25.

Next, based on the embedding data (1 or 0) for the block pair, the embedding processor 140 modifies the average density of B from the blocks Bl11 and Br11. For example, when embedding 1 into the blocks Bl11 and Br11, the embedding processor 140 modifies the average density of B from each block to an average density that is computed by using the expressions $$Nl=(Bl+Br)/2+D/2$$

$$Nr=(Bl+Br)/2-D/2.$$

Codes used in the aforementioned expressions are explained next. Nl means the average density (after data embedding) of the left block in the block pair. Nr means the average density (after data embedding) of the right block in the block pair. Bl means the average density (before data embedding) of the left block in the block pair. Br means the average density (before data embedding) of the right block in the block pair. D means the embedding strength.

To be specific, when embedding data 1 in the block pair having the embedding strength D=25 and consisting of the block Bl11 having the average density Bl=20 before data embedding and the block Br11 having the average density Br=40 before data embedding, because Nl is 42.5 and Nr is 17.5, the average density of B in the block Bl11 is modified to 42.5 and the average density of B in the block Br11 is modified to 17.5.

In other words, when embedding 1 into the block pair, the average densities of the blocks are modified such that the average density of the right block is less than the average density of the left block, and the difference between the average densities is equal to the embedding strength (25 in the aforementioned example).

When embedding 0 into the block pair of blocks Bl11 and Br11, the embedding processor 140 modifies the average density of B from each block to an average density that is computed by using the expressions $$Nl=(Bl+Br)/2-D/2$$

$$Nr=(Bl+Br)/2+D/2.$$

To be specific, when embedding data 0 in the block pair having the embedding strength D=25 and consisting of the block Bl11 having the average density Bl=20 before data embedding and the block Br11 having the average density Br=40 before data embedding, because Nl is 17.5 and Nr is 42.5, the average density of B in the block Bl11 is modified to 17.5 and the average density of B in the block Br11 is modified to 42.5.

In other words, when embedding 0 into the block pair, the average densities of the blocks are modified such that the average density of the left block is less than the average density of the right block, and the difference between the average densities is equal to the embedding strength (25 in the aforementioned example).

The embedding processor 140 does not embed data into a block pair if the respective values of Nl, Nr, Bl, Br, and D pertaining to the block pair satisfy the conditional expressions $$Nl<Nr \wedge Bl<Br \wedge Br-Bl>D \text{ or}$$

$$Nl>Nr \wedge Bl>Br \wedge Bl-Br>D.$$

In other words, if the respective values of Nl, Nr, Bl, Br, and D pertaining to the block pair satisfy any one of the aforementioned conditional expressions, because data that is specified by the average density of each block before data embedding matches with data that is specified by the average density of each block after data embedding, modification of the average density of each block is unnecessary.

After embedding data pertaining to the code for the error correcting code into each block pair of the split image data (hereinafter, the split image data that includes the embedded code for the error correcting code is referred to as "embedded image data"), the embedding processor 140 displays the embedded image data in the display device 20 or prints an image of the embedded image data by using a not shown printer etc.

Because the split image data shown in FIG. 6 includes 8 block pairs (16 blocks) in a line, a single line in the split image data is represented by an 8 bit code. Thus, the total number of lines (16 lines) in the split image data is represented by a 128 bit code. In other words, if the code for the error correcting code is a 15 bit code, data can be embedded into the split image data for a maximum 8 times.

Figure 8:
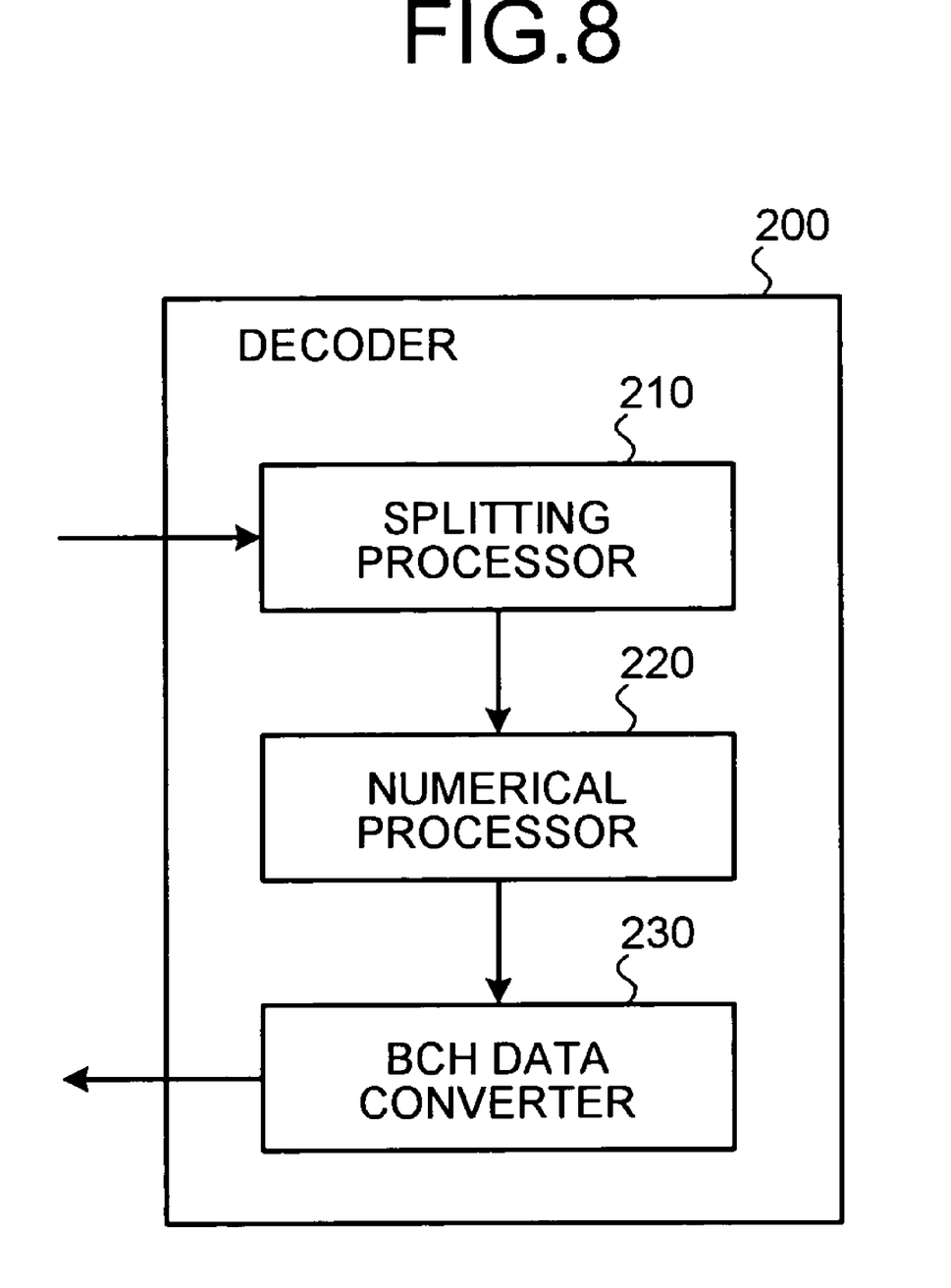
FIG. 8 is a functional block diagram of a structure of a decoder shown in FIG. 2.

To return to FIG. 2, the decoder 200 fetches the embedded image data from the input device 10, and extracts the embedding data from the fetched embedded image data. FIG. 8 is a functional block diagram of a structure of the decoder 200 shown in FIG. 2. As shown in FIG. 8, the decoder 200 includes a splitting processor 210, a numerical processor 220, and a BCH data converter 230.

The splitting processor 210 fetches the embedded image data from the input device 10, splits the fetched embedded image data into blocks of N rows and M lines, and distributes the split embedded image data to the numerical processor 220.

The numerical processor 220 fetches the embedded image data that is split by the splitting processor 210, extracts data from each block pair of the embedded image data, and distributes the extracted data to the BCH data processor 230 as a cluster of candidate codes for the error correcting code.

To be specific, the numerical processor 220 extracts a block pair from the embedded image data, and based on the values of the average density of B from the left and the right blocks, detects data that is embedded into the block pair.

If the absolute value of the difference between the average density of B from the left and the right blocks of the block pair is included in a predetermined threshold value, and the average density of B from the left block is greater than the average density of B from the right block, the numerical processor 220 determines that data 1 is embedded into the block pair.

If the absolute value of the difference between the average density of B from the left and the right blocks of the block pair is included in the predetermined threshold value, and the average density of B from the right block is greater than the average density of B from the left block, the numerical processor 220 determines that data 0 is embedded into the block pair.

If the absolute value of the difference between the average density of B from the left and the right blocks of the block pair is not included in the predetermined threshold value, because data embedded in the block pair cannot be detected, the numerical processor 220 determines that data 2 (not confirmed) is embedded in the block pair.

The BCH data converter 230 fetches a cluster of candidate codes for the error correcting code from the numerical processor 220 and based on the fetched cluster of candidate codes for the error correcting code extracts the embedding data.

Figure 9:
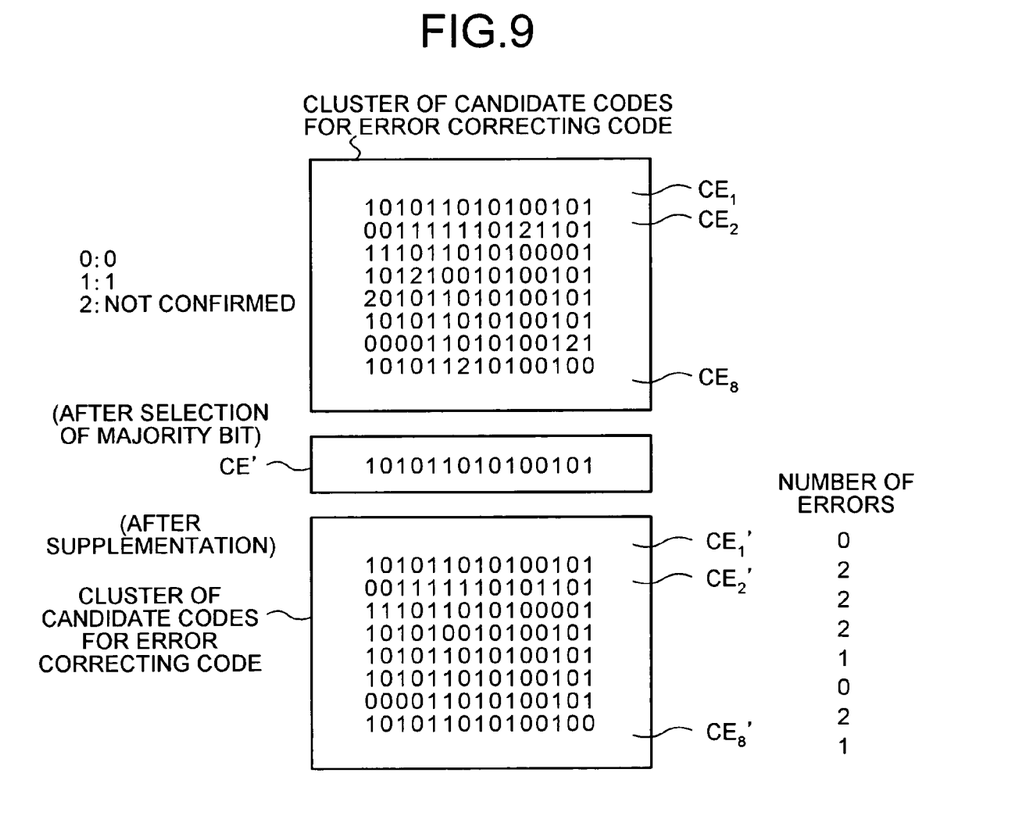
FIG. 9 depicts a process performed by a BCH data converter shown in FIG. 8.

FIG. 9 depicts a process performed by the BCH data converter 230. First, the BCH data converter 230 selects a majority bit for each bit unit from candidate codes for the error correcting code CE1 through CE8 that are included in the cluster of candidate codes for the error correcting code to determine each bit (a total of 15 bits) so as to set a code for the error correcting code CE'.

Selection of the majority bit is explained next. For example, in the candidate codes for the error correcting code CE1 through CE8, because five codes have 1 as the first bit, two codes have 0 as the first bit, and one code has 2 as the first bit, based on the majority result, 1 is selected as the first bit of the code for the error correcting code CE'. Similarly, each bit of the code for the error correcting code CE' is selected by using the aforementioned method.

Next, the BCH data converter 230 executes a supplementary process to replace the bits indicated by 2 (not confirmed) of the candidate codes for the error correcting code CE1 through CE8 with bits corresponding to the bit of the error correcting code CE' to obtain candidate codes for the error correcting codes CE1' through CE8' (cluster of candidate codes for the error correcting code after supplementation).

After supplementation, the BCH data converter 230 executes an error correcting code decoding process on each of the candidate codes for the error correcting codes CE1' through CE8' (for example, a decoding process based on a BCH code) to obtain the embedding data and a number of errors. The number of errors indicates the number of error bits in each of the codes for the error correcting code CE1' through CE8'.

Next, the BCH data converter 230 outputs in the display device 20, as the embedding data, the code having the least number of errors among the codes obtained as a result of the error correcting code decoding process. In the example shown in FIG. 9, the candidate codes for the error correcting code CE1' and CE8' have the least number of errors and the same code 101011010100101. Thus, 101011010100101 is output in the display device 20 as the embedding data.

Figure 10:
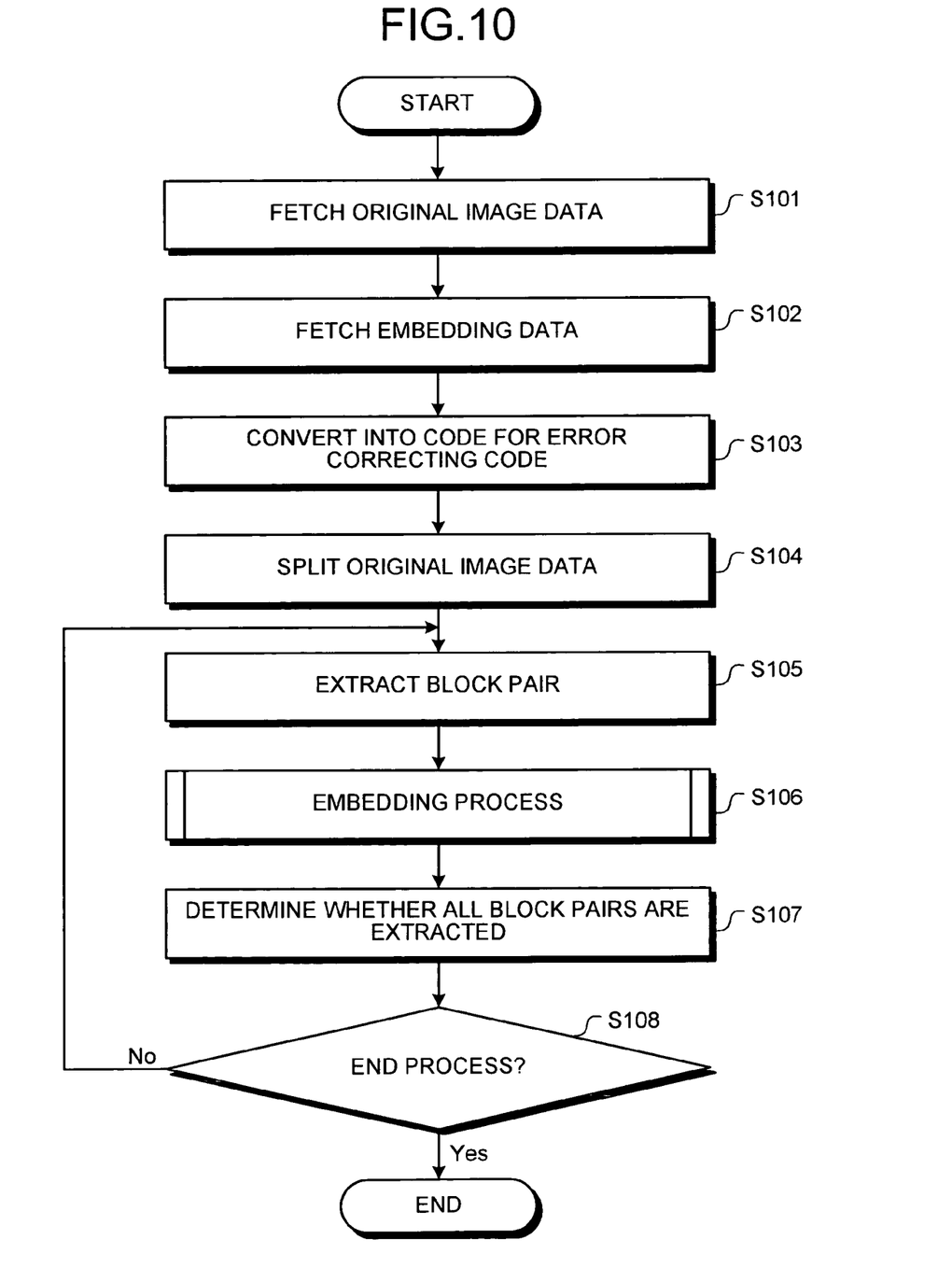
FIG. 10 is a flowchart of a process performed by the encoder.

A process of the encoder 100 according to the embodiment is explained next. FIG. 10 is a flowchart of a process performed by the encoder 100. The data receiver 110 of the encoder 100 fetches the original image data, passes the original image data to the splitting processor 130 (step S101), fetches the embedding data, and passes the embedding data to the BCH data converter 120 (step S102).

The BCH data converter 120 converts the embedding data into the code for error correcting code and passes the converted code for error correcting code to the embedding processor 140 (step S103). The splitting processor 130 splits the original image data to generate split image data, and passes the generated split image data to the embedding processor 140 (step S104).

Next, the embedding processor 140 extracts block pairs (step S105), executes an embedding process (step S106), and determines whether all the block pairs are extracted (step S107).

If all the block pairs are not extracted (No at step S108), the process returns to step S105. If all the block pairs are extracted (Yes at step S108), the process ends.

Figure 11:
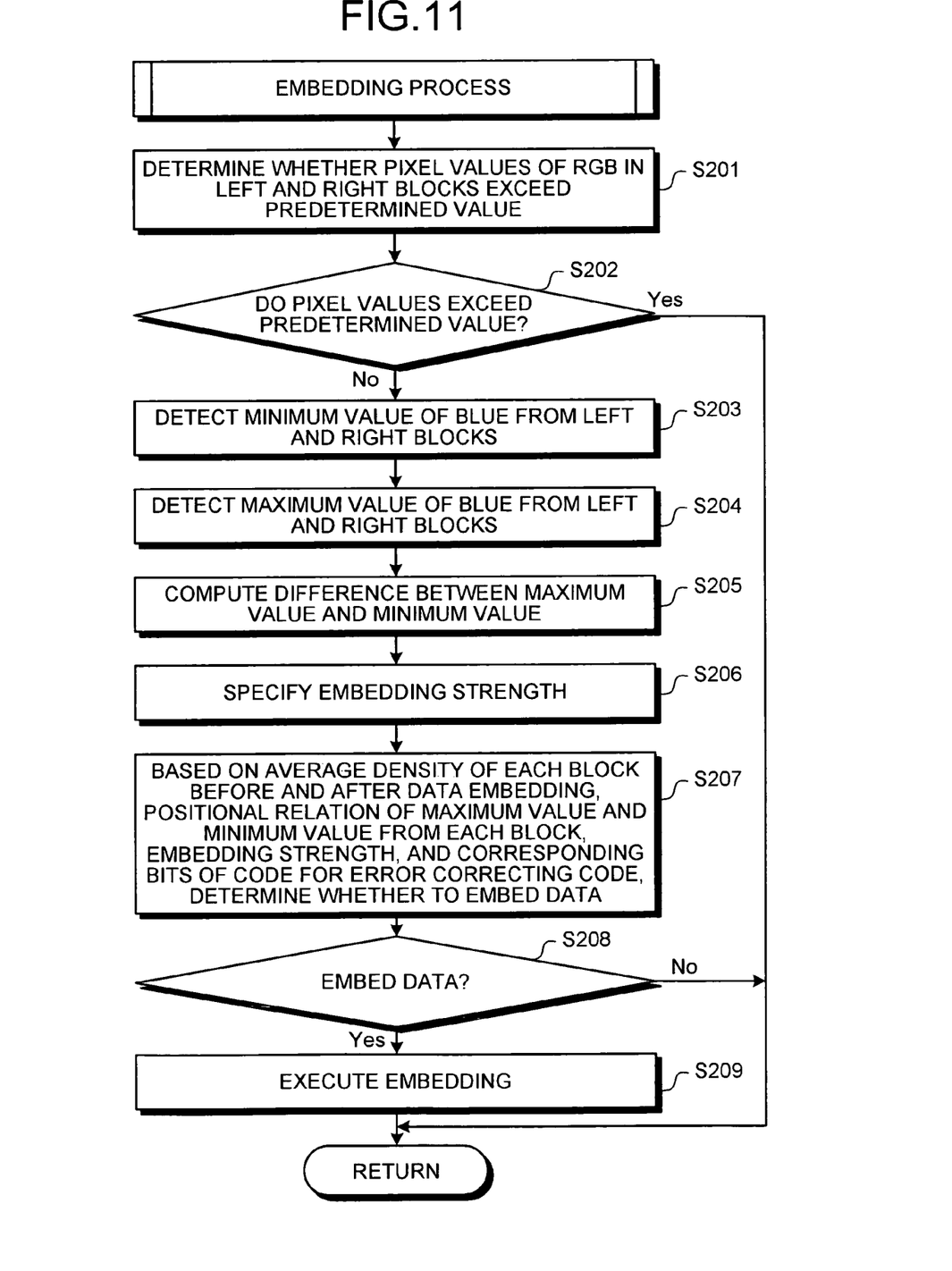
FIG. 11 is a flow chart of an embedding process at step S106 in FIG. 10.

FIG. 11 is a flow chart of the embedding process at step S106 in FIG. 10. The embedding processor 140 determines whether pixel values of RGB in the left and the right blocks of the extracted block pair exceed a predetermined value (for example, greater than 200) (step S201), and if the pixel values exceed the predetermined value (Yes at step S202), ends the embedding process.

If the pixel values of RGB are less than the predetermined value (No at step S202), the embedding processor 140 detects the minimum average density of Blue from each of the blocks (step S203), detects the maximum average density of Blue from each of the blocks (step S204), and computes the difference between the maximum value and the minimum value (step S205).

Based on the minimum value, the difference between the minimum value and the maximum value, and the embedding strength specifying table 150a, the embedding processor 140 specifies embedding strength (step S206). Based on the average density of each block before and after data embedding, a positional relation of, the maximum value and the minimum value from each block, the embedding strength, and the code for error correcting code, the embedding processor 140 determines whether to embed data (step S207). At step S207, the embedding processor 140 determines whether the average density of each block before and after data embedding and the embedding strength satisfy any one of the aforementioned conditional expressions.

Upon determining to embed data (Yes at step S208), the embedding processor 140 executes data embedding (step S209). Upon determining not to embed data (No at step S208), the embedding processor 140 ends the embedding process.

Thus, when embedding data into the original image data, if the pixel values of RGB from the block pair are less than the predetermined value, based on the difference between the average density of each block in the block pair, the encoder 100 sets the amount of modification (embedding strength) and embeds data, thereby enabling to prevent deterioration of image quality.

Figure 12:
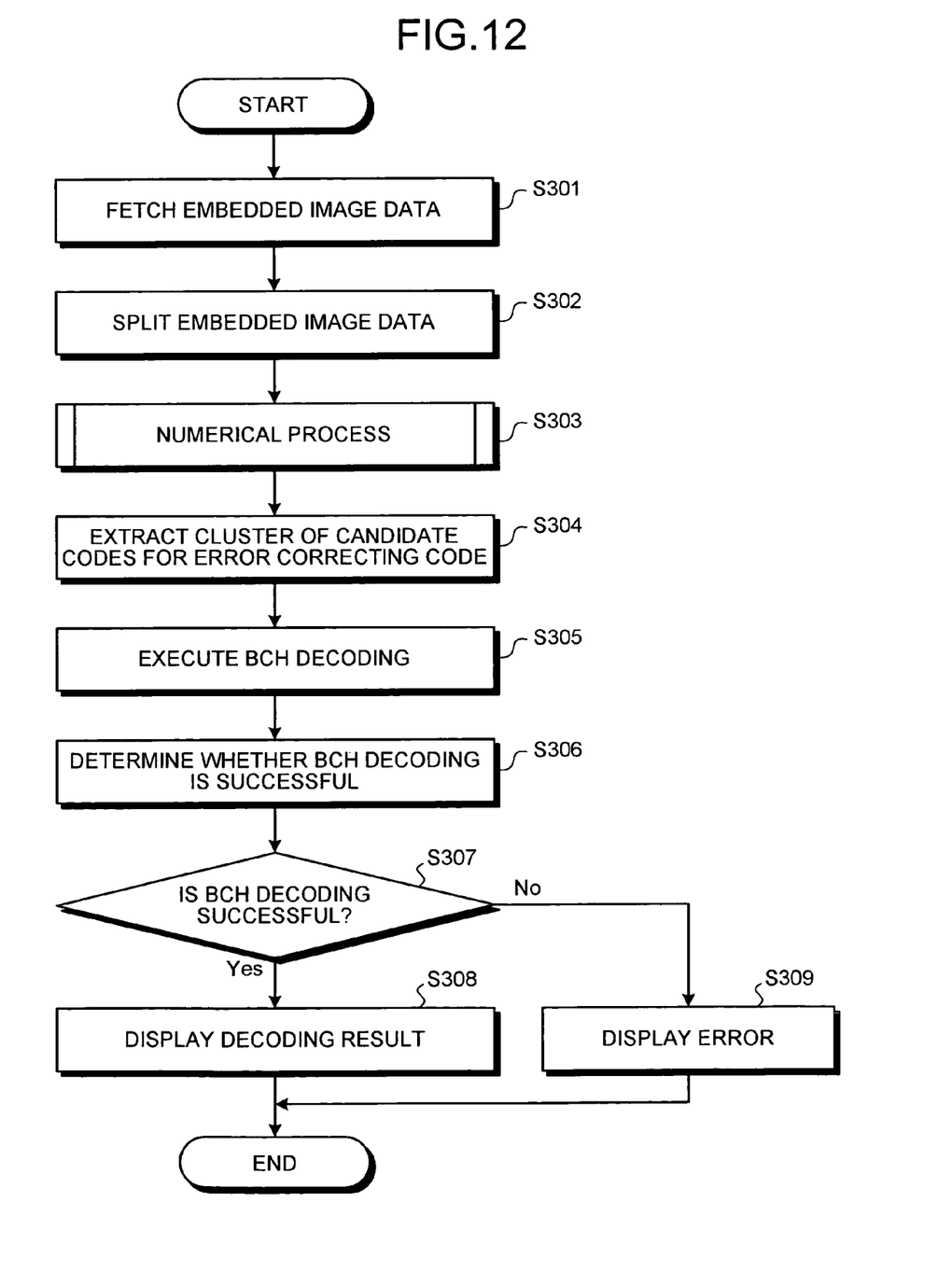
FIG. 12 is a flow chart of the process performed by the decoder.

A process of the decoder 200 according to the embodiment is explained next. FIG. 12 is a flow chart of the process performed by the decoder 200. The splitting processor 210 of the decoder 200 fetches the embedded image data (step S301), splits the embedded image data, and passes the split embedded image data to the numerical processor 220 (step S302).

Next, the numerical processor 220 executes a numerical process (step S303), and extracts the cluster of candidate codes for the error correcting code from the embedded image data (step S304). The BCH data converter 230 executes BCH decoding (step S305), and determines whether the BCH decoding is successful (step S306).

If the BCH decoding is successful (Yes at step S307), the BCH data converter 230 displays the decoding result in the display device 20 (step S308). If the BCH decoding is not successful (No at step S307), the BCH data converter 230 displays an error message in the display device 20 (step S309).

Figure 13:
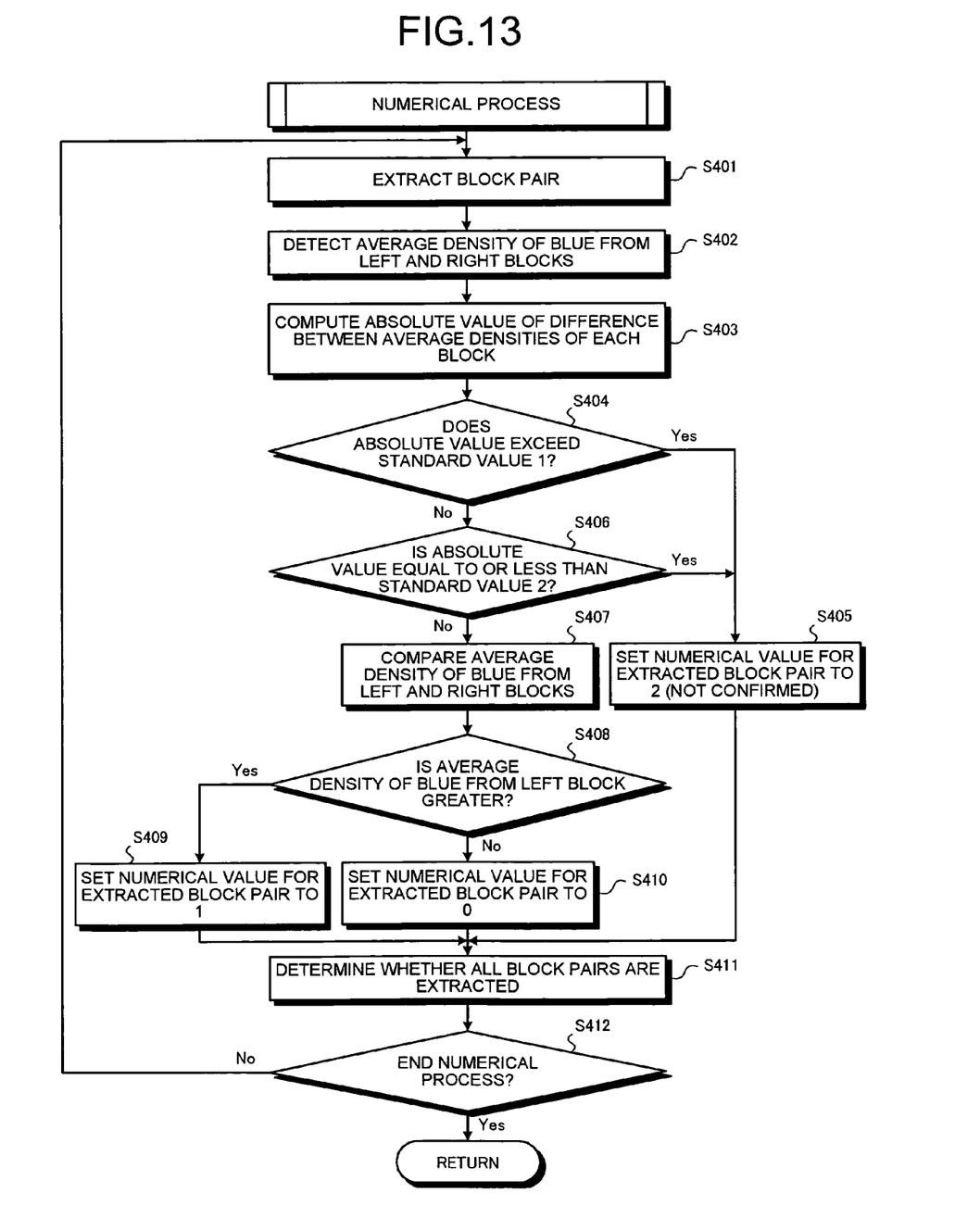
FIG. 13 is a flow chart of a numerical process at step S303 of FIG. 12.

FIG. 13 is a flow chart of the numerical process at step S303 of FIG. 12. The numerical processor 220 extracts a block pair from the embedded image (step S401), and detects the average density of Blue from each of the blocks (step S402).

The numerical processor 220 computes an absolute value of the difference between the average density of each block (step S403), and determines whether the absolute value exceeds a standard value 1 (step S404). If the absolute value exceeds the standard value 1 (Yes at step S404), the numerical processor 220 sets a numerical value for the extracted block pair to 2 (step S405), and the numerical process moves to step S411.

If the absolute value is less than the standard value 1 (No at step S404), the numerical processor 220 determines whether the absolute value is less than a standard value 2 (step S406). If the absolute value is less than the standard value 2 (Yes at step S406), the numerical process moves to step S411.

If the absolute value is greater than the standard value 2 (No at step S406), the numerical processor 220 compares the average density of Blue pertaining to each block in the block pair (step S407). If the average density of Blue pertaining to the left block is greater (Yes at step S408), the numerical processor 220 sets the numerical value for the extracted block pair to 1 (step S409), and the numerical process moves to step S411.

If the average density of Blue pertaining to the right block is greater (No at step S408), the numerical processor 220 sets the numerical value for the extracted block pair to 0 (step S410), and determines whether all the block pairs are extracted (step S411). If all the block pairs are not extracted (No at step S412), the numerical process returns to step S401. If all the block pairs are extracted (Yes at step S412), the numerical processor 220 ends the numerical process.

Thus, the numerical processor 220 of the decoder 200 extracts the cluster of candidate codes for the error correcting code from the embedded image data, and based on the cluster of candidate codes for the error correcting code, the BCH data converter 230 executes decoding, thereby enabling to extract the embedding data from the embedded image data.

Thus, in the image data processor 50 according to the embodiment, when embedding data into the original image data, the encoder 100 determines whether pixel values of three primary colors (RGB) in a block pair are less than a predetermine value. If the pixel values of the three primary colors are less than the predetermined value, based on density difference (difference between average density) of the blocks in the block pair, the encoder 100 sets the embedding strength, and modifies the average density of each block to embed data, thereby enabling to prevent deterioration of image quality of the original image data.

Figure 14:
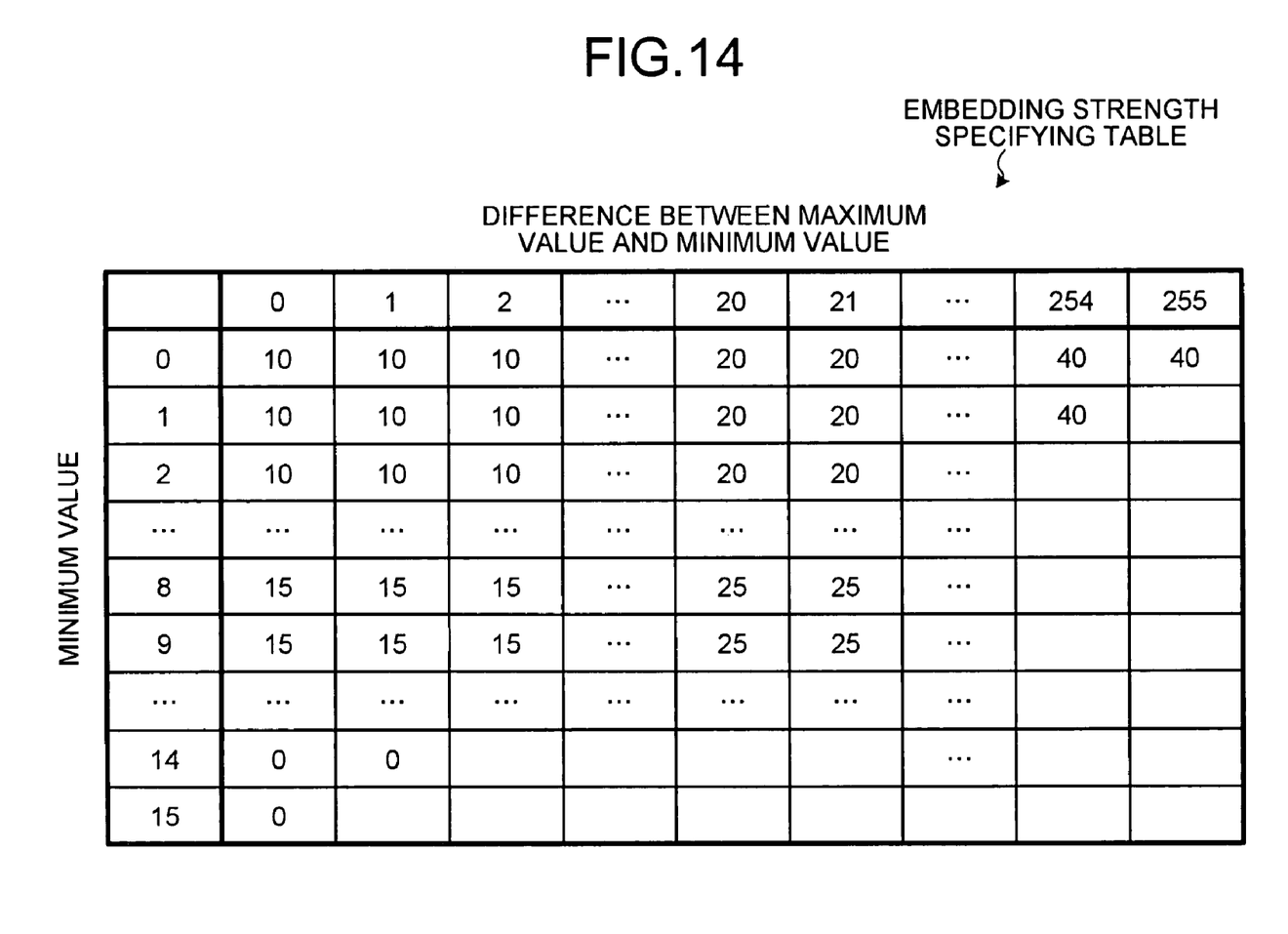
FIG. 14 depicts an example of an embedding strength specifying table having a vertical axis that is divided into 16 parts.

In the embodiment, the vertical axis (axis of the minimum value) of the embedding strength specifying table 150a shown in FIG. 7 is divided into 256 parts. However, as shown in FIG. 14, the vertical axis can also be divided, for example, into 16 parts. In other words, the vertical axis can be divided into one sixteenth of 256 parts. Thus, by using an embedding strength specifying table having a vertical axis divided into 16 parts, the amount of memory can be reduced.

When setting the embedding strength by using the embedding strength specifying table shown in FIG. 14, the encoder 100 extracts the minimum value and the maximum value of the average density of Blue from each block. Next, the encoder 100 sets the embedding strength based on the difference between the maximum value and the minimum value, and a value that is computed by dividing the minimum value by 64.

Figure 15:
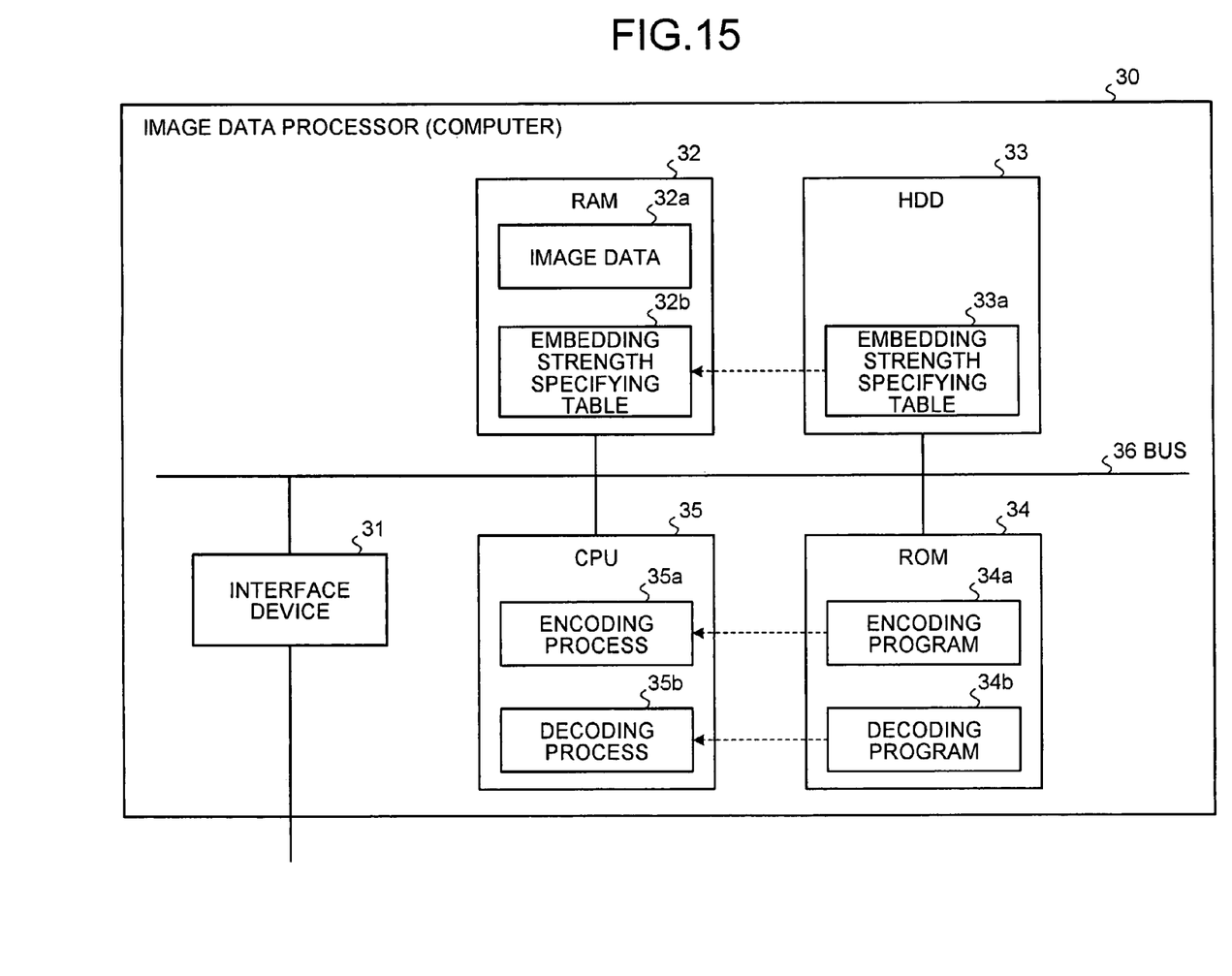
FIG. 15 is a drawing of a computer that executes a data embedding program.

Each process of the image data processor 50 explained in the embodiment can be realized by executing a program pertaining to data embedding process using a computer. An example of a computer 30, which executes a data embedding program having functions similar to the functions in the embodiment is explained with reference to FIG. 15. FIG. 15 is a drawing of the computer 30 that executes the data embedding program.

The computer 30 includes an interface device 31, a Random Access Memory (RAM) 32, a Hard Disk Drive (HDD) 33, a Read Only Memory (ROM) 34, and a Central Processing Unit (CPU) 35 that are connected by buses 36. The interface device 31 corresponds to the interface shown in FIG. 2.

The data embedding program having similar functions as the image data processor 50 according to the embodiment, in other words, an encoding program 34a and a decoding program 34b are prior stored in the ROM 34.

The encoding program 34a and the decoding program 34b are read by the CPU 35 from the ROM 34 and executed. Thus, the encoding program 34a and the decoding program 34b function as an encoding process 35a and a decoding process 35b respectively. The encoding process 35a and the decoding process 35b correspond respectively to the encoder 100 and the decoder 200 shown in FIG. 2.

An embedding strength specifying table 33a is recorded in the HDD 33. The embedding strength specifying table 33a corresponds to the embedding strength specifying table 150a shown in FIG. 3. The CPU 35 reads the embedding strength specifying table 33a as the RAM 32, and uses the embedding strength specifying table 33a to embed predetermined data into image data 32a.

The encoding program 34a and the decoding program 34b need not be prior stored in the ROM 34. The encoding program 34a and the decoding program 34b can be stored in a portable physical medium such as a Flexible Disk (FD), a Compact Disk-Read Only Memory (CD-ROM), a Magneto Optic (MO) disk, a Digital Versatile Disk (DVD), a magneto optical disk, an Integrated Circuit (IC) card etc., that is inserted into the computer 30, a fixed physical medium such as an HDD that is provided inside or outside the computer 30, another computer (or server) that is connected to the computer 30 via a public line, the Internet, a Local Area Network (LAN), a Wide Area Network (WAN) etc. The encoding program 34a and the decoding program 34b can be read by the computer 30 from the aforementioned media and executed.

According to the present invention, deterioration of image quality of image data can be prevented.

Further, a success rate during decoding can be enhanced.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An apparatus for embedding data into an area of image data, comprising:
 a determining unit that determines whether colors of the area are specific colors; and
 an embedding unit that
  modifies image data of the area based on a determination result of the determining unit,
  does not embed the data into the area if the determining unit determines colors of the area are the specific colors, and
  embeds the data into the area if the determining unit determines colors of the area are not the specific colors, wherein the specific colors are achromatic colors.

2. The apparatus according to claim 1, wherein the specific colors include three primary colors, and pixel values of each of the three primary colors are equal to or more than a threshold.

3. The apparatus according to claim 2, wherein the threshold is 200.

4. The apparatus according to claim 1, wherein the embedding unit sets the amount of modification based on grayscale values in the area.

5. The apparatus according to claim 1, wherein the embedding unit detects the degree of change of the feature based on a difference between grayscale values of pixels in the area.

6. The apparatus according to claim 5, wherein the embedding unit increases the amount of modification according to an increase in the difference.

7. A printed material comprising an image that includes data that is embedded by using the apparatus according to claim 1.

8. A computer-readable recording medium that stores therein a computer program that causes a computer to embed data into an area of image data, wherein the program causes the computer to execute:
 determining whether colors of the area are specific colors;
 modifying image data of the area based on a determination result at the determining; and
 embedding the data into the area only if the determining determines colors of the area are not the specific colors, wherein the specific colors are achromatic colors.

9. The computer-readable recording medium according to claim 8, wherein the specific colors include three primary colors, and pixel values of each of the three primary colors are equal to or more than a threshold.

10. The apparatus according to claim 9, wherein the threshold is 200.

* * * * *